United States Patent [19]

Groepper et al.

[11] Patent Number: 5,245,084
[45] Date of Patent: Sep. 14, 1993

[54] MIXTURE SUITED FOR CROSSLINKING POLYMERS AND PROCESS FOR CROSSLINKING POLYMERS WITH EXTENSION OF SCORCH TIME

[75] Inventors: Jurgen Groepper, Gunzburg; Harald Hofmann, Weibenhorn, both of Fed. Rep. of Germany

[73] Assignee: Luperox GmbH, Gunzburg, Fed. Rep. of Germany

[21] Appl. No.: 777,475

[22] Filed: Oct. 17, 1991

Related U.S. Application Data

[63] Continuation of Ser. No. 361,165, Jun. 5, 1989, abandoned.

[30] Foreign Application Priority Data

Jun. 14, 1988 [DE] Fed. Rep. of Germany ....... 3820252

[51] Int. Cl.$^5$ ............................................. C07C 409/00
[52] U.S. Cl. .................................. 568/558; 526/226; 526/293; 568/559; 568/564; 568/722; 568/723; 568/729; 568/763; 568/772
[58] Field of Search ................ 526/226, 293; 568/558, 568/559, 564, 722, 723, 729, 763, 772

[56] References Cited

U.S. PATENT DOCUMENTS

| | | | |
|---|---|---|---|
| 3,335,124 | 8/1967 | Larsen | 260/94.9 |
| 3,737,405 | 6/1973 | Linder et al. | 525/263 |
| 3,903,199 | 9/1975 | Dalton | 525/263 |
| 3,928,494 | 12/1975 | Aliberti | 525/263 |
| 4,048,259 | 9/1977 | Wegemund et al. | 525/263 |

FOREIGN PATENT DOCUMENTS 1386616 3/1975 United Kingdom .
1535038 12/1978 United Kingdom .

OTHER PUBLICATIONS

Chem. Abstracts, vol. 102:205267, p. 69, "Abstracting Compositions for Elastomer Vulcanization", Kenki Kagaku Kogyo, K.K., JPN Tokkyo Koho JP. 59,215,347.

Chem. Abstracts, vol. 89:130748y, p. 61, "Abstracting Delayed Action Peroxide Vulcanization Systems", Chow, Y. W., Knight, G. T. (Malay, Rubber Prod. Res. Assoc. Brickendonbury/Hertford, Engl.).

*Primary Examiner*—Bernard Lipman
*Attorney, Agent, or Firm*—Stanley A. Marcus; Royal E. Bright

[57] ABSTRACT

The mixture consists of at least one organic peroxide, at least one hydroquinone derivative of the general formulae I and/or II and/or III

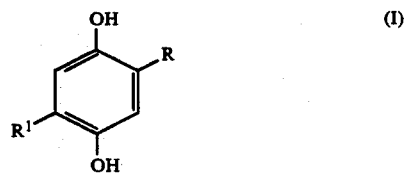

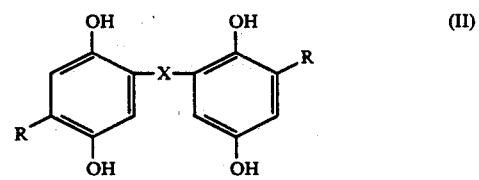

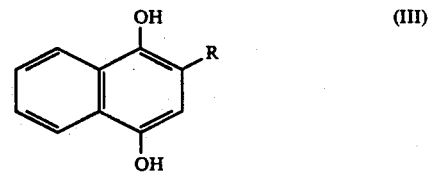

wherein R and R$^1$, which may be identical or different, stand for H or t-alkyl, and X stands, for example, for C$_{1-18}$-alkylene, and a crosslinkage promoter, and permits the crosslinkage of polymers and at the same time extends the scorch time, which must be understood as the processing time.

9 Claims, No Drawings

MIXTURE SUITED FOR CROSSLINKING POLYMERS AND PROCESS FOR CROSSLINKING POLYMERS WITH EXTENSION OF SCORCH TIME

This is a continuation of copending application Ser. No. 07/361,165, filed on Jun. 5, 1989, now abandoned.

DESCRIPTION

The invention relates to a mixture suited for crosslinking polymers and to a process for crosslinking polymers and at the same time extending the scorch time.

Organic peroxides are employed for crosslinking polyolefins and elastomers if the final products have to meet high mechanical and physical requirements, such as improved thermal aging and lower residual (permanent) deformation under pressure, compared with sulfur-crosslinked elastomers.

Crosslinking period, and the time from the addition of the organic peroxide to the polymer up to incipient cross-linkage (scorch time), are dependent on the thermal decomposition rate (half-life period) of the peroxides used as crosslinking agents. It is frequently desirable to extend the scorch time—(which must be regarded as processing period) without extending the crosslinking time—as is possible in sulfur-curing by the use of inhibitor and accelerator system in rubber—and without deterioration of crosslinkage (resultant from degree of crosslinkage and density of crosslinkage).

It is possible in peroxidic crosslinkage to extend the scorch time by the use of higher responsive crosslinkage initiators, i.e. initiators with longer half-life period; however, this is accompanied by a longer crosslinking period, and thus lower productivity.

Also the lowering of the process temperature allows the desired extension of the scorch time, but again results in lower productivity.

The extension of the scorch time can also be realized by the use of certain auxiliary substances in the peroxidic crosslinkage of polymers:

German laid-open applications 2 553 145 and 2 553 094 describe the use of the hydroperoxides cumene hydroperoxide and t-butyl hydroperoxide as scorch time extenders in the peroxidic crosslinkage of ethylene homopolymers and copolymers. The desired extension of the scorch time, however, is accompanied by an undesirable deterioration of the crosslinkage.

British Patent No. 1,386,616 discloses the use of N-nitroso-diarylamines (e.g. N-nitroso-di-phenylamine) or N,N'-dinitroso-N,N'-diaryl-p-phenylene diamines (e.g. N,N'-dinitroso-N,N'-diphenyl-p-phenylene diamine) as retarding agents (=scorch inhibitors) in the peroxidic crosslinkage of rubber in combination with methacrylic or acrylic crosslinkage promoters (e.g. trimethylol propane-trimethacrylate). These nitroso compounds like—all N-nitroso compounds—are suspected to have a carcinogenic effect in humans.

Y. W. Chow and G. Y. Knight, Rubbercon 77, Int. Rubber Conf. 1977, 2, contribution No. 24, describe the cross-linkage of rubber by means of dicumyl peroxide in the presence of m-phenylene bis-maleinimide as crosslinkage promoter and a radical scavenger, such as N-nitrosodiphenylamine, as scorch retarded. In addition to the desired extension of the scorch time, however, the crosslinkage time is undesirably delayed.

U.S. Pat. No. 3,335,124 describes the peroxidic crosslinkage of polyethylene with the use of the following classes of substances as retarders to extend the scorch time: (a) antioxidants (inter alia also 2,5-di-t-butyl hydroquinone and 2,5-di-t-amyl hydroquinone) or (b) compounds generally known as accelerators for the sulfur cross-linkage of rubber (e.g. 2-mercaptobenzothiazole, tetramethyl thiuram disulfide) or (c) compounds having both antioxidant function and accelerator function in the sulfur curing of rubber (e.g. amine-/aldehyde adducts such as hexamethylene tetramine or butyraldehyde-monobutylamine - condensation product). Crosslinkage promoters are not used.

The Japanese Kokai Tokkyo Koho publication 59 215 347 (84 215 347) describes a process for crosslinking acrylic rubber by means of peroxide (dicumyl peroxide) as cross-linker in the presence of a crosslinkage promoter (e.g. triallyl isocyanurate) and/or a thiourea derivative (e.g. trimethyl thiourea) and phenothiazine as scorch time extender.

According to British Patent No. 1,535,038 ethylene homopolymers or copolymers are crosslinked by means of peroxide (e.g. dicumyl peroxide) as crosslinking agent in the presence of a crosslinkage promoter having at least 3 allyl groups (e.g. triallyl cyanurate, triallyl phosphate, tetraallyl oxyethane) and an organic hydroperoxide (e.g. t-butyl hydroperoxide, cumene hydroperoxide) as scorch time extender.

The object of the invention is the extension of the scorch time in the crosslinkage of polymers with organic peroxides, while avoiding an extension of the crosslinking time and a derioration of the crosslinkage; the scorch time extender is not to be volatile (like hydroperoxide), not toxic (like N-nitroso compounds) and is not to contain sulfur (like phenothiazine) in order to avoid unpleasant odors given off by the crosslinked final product.

This object is realized by the use of a combination of organic peroxide, a hydroquinone derivative, and a cross-linkage promoter.

The subject matter of the invention therefore is a mixture containing
(a) at least one organic peroxide suitable for crosslinking polymers,
(b) at least one hydroquinone derivative of the general formula I and/or II and/or III

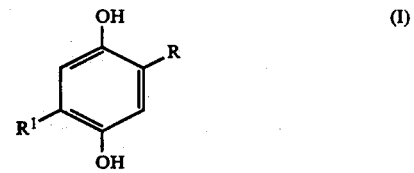

(I)

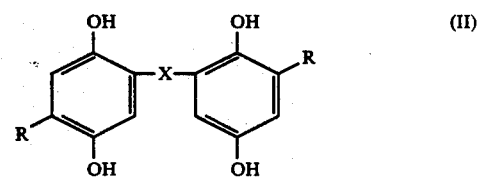

(II)

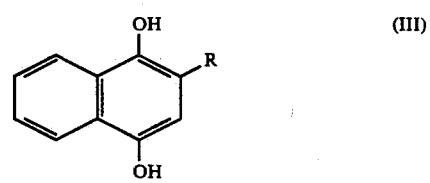

(III)

wherein R and $R^1$, which may be identical or different, stand for H, t-alkyl, t-cycloalkyl, or aryl-t-alkyl and X=$C_{1-18}$-alkylene optionally substituted by $C_{1-10}$-alkyl and/or $C_{1-10}$-alkoxy and/or phenyl, $C_{2-18}$-alkenylene or $C_{2-18}$-alkpolyenylene both of which may be substituted by $C_{1-10}$-alkyl, or —$(CR^2R^3)_n$—Ar—$(CR^2R^3)_m$— wherein $R^2$ and $R^3$ are identical or different and stand for hydrogen or $C_{1-10}$-alkyl, Ar is phenyl or naphthyl, n and m stand for 0 to 18, and n+m≦18, and X preferably stands for —$CH_2CH=CHCH_2$—, —$CH_2$—, $CH_3$—CH<, $(CH_3)_2C<$, or —$C(CH_3)_2$—$C_6H_4$—$C(CH_3)_2$—, where the hydroquinones of the formula III are optionally substituted by $C_{1-10}$-alkyl at the benzene ring of the naphthalene structure which is not substituted by the hydroxy groups and R, and (c) at least one crosslinkage promoter, and a process for crosslinking polymers with extension of the scorch time, especially of polyolefins and elastomers, by the addition to the polymers to be crosslinked of (a) at least one organic peroxide suited for crosslinkage of polymers, (b) at least one hydroquinone derivative of the general formulae I and/or II and/or III

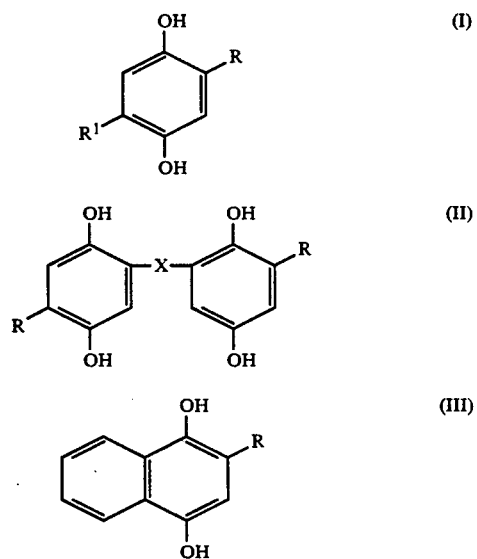

wherein R and $R^1$, which may be identical or different, stand for H, t-alkyl, t-cycloalkyl or aryl-t-alkyl and X=$C_{1-18}$-alkylene optionally substituted by $C_{1-10}$-alkyl and/or $C_{1-10}$-alkoxy and/or phenyl, $C_{2-18}$-alkenylene or $C_{2-18}$-alkpolyenylene both of which may be substituted by $C_{1-10}$-alkyl, or —$(CR^2R^3)_n$—Ar—$(CR^2R^3)_m$—, wherein $R^2$ and $R^3$ are identical or different and represent hydrogen or $C_{1-10}$-alkyl, Ar stands for phenyl or naphthyl, n and m are 0 to 18, and n+m≦18, and wherein X preferably is —$CH_2CH=CHCH_2$, —$CH_2$—, $CH_3$—CH<, $(CH_3)_2C<$ or —$C(CH_3)_2$—$C_6H_4$—$C(CH_3)_2$— where the hydroquinones of formula III are optionally substituted by $C_{1-10}$-alkyl at the benzene ring of the naphthalene structure not substituted by the hydroxy groups and R, and (c) at least one crosslinkage promoter either separately or simultaneously, or successively, or in the form of a mixture. In case of separate addition of the components the peroxide is normally added last.

The combination used according to the invention crosslinks a polymer in the same time and with equally good cross-linking effect as the peroxide alone, while it provides the desired longer scorch time.

The mixtures according to the invention possess unexpectedly good storage stability despite the incompatibility of peroxide and hydroquinone derivatives, and of peroxide and crosslinkage promoters, during storage.

The polymers employed preferably are polyolefins and elastomers, namely homopolymers and copolymers amenable to crosslinkage by peroxides and described in "Rubber World", October 1983, pages 26 to 32, in the article "Crosslinkage of Elastomers" and in "Rubber and Plastics News", September 1980, pages 46 to 50, in the article "Organic Peroxides for Crosslinkage of Rubber". These include, inter alia, the following polymers: low density polyethylene (LDPE), medium density polyethylene (MDPE), high density polyethylene (HDPE), linear low density polyethylene (LLDPE), linear medium density polyethylene (LMDPE), ethylene/propylene/diene terpolymer (EPDM), ethylene/propylene copolymer, 1,4-polybutadiene, butadiene/styrene rubber, butadiene/styrene/acrylonitrile rubber, chlorinated polyethylene, chlorosulfonated polyethylene (=Hypalon), silicone rubber, nitrile rubber, butyl rubber, fluorinated rubber and ethylene/vinyl acetate copolymer (EVA). Also mixtures of these polymers can be used.

Organic peroxides in the sense of the present invention are peroxides forming corsslinkage-active free radicals upon thermal decomposition. Preferred peroxides are dialkyl peroxides and ketal peroxides, as described in "Encyclopedia of Chemical Technology", 3rd Edition, Vol. 17, pages 27 to 90.

The group of dialkyl peroxides used as preferred initiators includes, for example, dicumyl peroxide, di-t-butyl peroxide, t-butyl cumyl peroxide, 2,5-dimethyl-2,5-bis(t-butylperoxy) hexane, 2,5-dimethyl-2,5-bis(t-butylperoxy)-hexine-(3), alpha,alpha'-bis(t-butylperoxy)-diisopropylbenzene, di-t-amyl-peroxide, 1,3,5-tris(2-t-butylperoxy-isopropyl) benzene, 1-phenyl-1-t-butyl-peroxy phthalide.

The group of ketal peroxides, being likewise preferred initiators, includes, for example, 1,1-bis(t-butylperoxy)-3,3,5-trimethylcyclohexane, 1,1-bis(t-butylperoxy) cyclohexane, 2,2'-bis(t-butylperoxy) butane, ethyl-3,3-bis(t-butylperoxy) butyrate, n-butyl-4,4-bis(t-butylperoxy) valerate, and others.

From the group of peresters t-butyl-peroxybenzoate and t-butylperoxy-o-methyl benzoate are mentioned.

As representatives of mixed dialkylperoxide perketals 3,3,6,6,9,9-hexamethyl-1,2,4,5-tetraoxanonane and 3,6,6,9,9-pentamethyl-3-carbethoxy-1,2,4,5-tetraoxanonane are mentioned.

Also other peroxides can be used as free radical source, and mixtures of different peroxides may be employed.

The peroxides are used in quantities from 0.1% to 15%, based on the polymer, especially from 1% to 10%, preferably 1% to 8%.

In the hydroquinone derivatives of the general formulae I, II and III used according to the invention R and $R^1$ preferably stand for t-butyl, t-amyl, t-hexyl (=1,1-diethylethyl or 1,1-dimethylbutyl), t-octyl (=1,1,3,3-tetramethylbutyl), 1-methylcyclohexyl-(1);

α-cumyl or p-isopropylcumyl, and X stands preferably for butanediyl-(1,4), octanediyl-(1,8), octatriene-(2,4,6)-diyl-(1,8), PhCH<, Ph(CH$_3$)C<, (Ph)$_2$C<, —CH$_2$CH=CH—CH$_2$—, —CH$_2$—, CH$_3$CH<, (CH$_3$)$_2$C<, meta or para—C(CH$_3$)$_2$—C$_6$H$_4$—C(CH$_3$)$_2$—.

Examples of hydroquinone derivatives of the formulae I, II and III are mono-t-butyl hydroquinone, 2,5-di-t-butyl hydroquinone, mono-t-amyl-hydroquinone, 2,5-di-t-amyl hydroquinone, mono-(or 2,5-di)-t-hexyl hydroquinone, mono-(or 2,5-di)-t-octyl hydroquinone, mono-(or 2,5-di)-1-methylcyclohexyl-(1)-hydroquinone, mono-(or 2,5-di)-cumyl hydroquinone; 1,4-bis(2-t-butyl hydroquinonyl-(5))-butene-(2), alpha,alpha'-bis(2-t-butyl hydroquinonyl-(5)) diisopropylbenzene; 2-t-butyl-5-t-amyl hydroquinone, 2-t-butyl-5-t-octyl-hydroquinone; 2-t-butyl naphthohydroquinone, 2-t-amyl naphthohydroquinone.

Mono-t-butyl hydroquinone (I, R=t-butyl, R$^1$=H) or 2,5-di-t-amyl hydroquinone (I, R=R$^1$=t-amyl) are especially preferred.

The scorch time extenders are used in quantities from 0.1% to 10%, based on polymer, especially from 0.2% to 2%, preferably 0.1% to 0.5%.

The crosslinkage promoters used according to the invention preferably are compounds containing at least two polymerizable C—C double bonds. They are bifunctional and polyfunctional monomers. They include all di- and polyacryl, methacryl, vinyl, allyl, and methallyl monomers such as triallyl cyanurate, triallyl isocyanurate, triallyl phosphate, triallyl trimellitate, triallyl citrate, diallyl terephthalate, diallyl adipate, diallyl maleinate, diallyl fumarate, trimethylpropane trimethacrylate, ethylene glycol dimethacrylate, trimethylolpropane triacrylate, and m-phenylene bismaleinimide.

Also mixtures of various crosslinkage promoters can be used.

The crosslinkage promoters are used in quantities of from 0.1% to 15%, based on polymer, especially from 0.1% to 5%, preferably 0.2 to 2%.

The mixing ratio of peroxide to scorch time extender to crosslinkage promoter can vary within wide limits, namely peroxide from 5 to 90%, preferably 20 to 90%, especially 20 to 50%; scorch time extender from 0.1 to 50%, preferably 1 to 30%, especially 2 to 20%, and cross-linkage promoter from 0.1 to 90%, preferably 1 to 30%, especially 2 to 20%, based on the total weight of (a) +(b)+(c).

Examples for optimum mixing ratios are
75% 1,1-bis(t-butylperoxy-3,3,5-trimethylcyclohexanone
8% 2,5-di-t-amyl hydroquinone
17% triallyl trimellitate
73% 2,5-dimethyl-2,5-bis(t-butylperoxy)hexane
7% 2,5-di-t-amyl hydroquinone
20% triallyl trimellitate
73% dicumyl peroxide
6.5% di-t-butyl hydroquinone
19.5% triallyl cyanurate The mixture according to the invention may be liquid and may contain inert solvent as fourth component. It may be a powder and may contain as fourth component inert powdered fillers (e.g. silica, calcium carbonate, kaolin, talcum), or it may be a paste and may contain as fourth component inert powdered fillers and optionally as fifth component inert solvents. Alternatively, it may be a granular product and may contain solid and liquid products as further components. Moreover, it may be used as master batch, and in that case it may additionally contain a polymer (e.g. EPDM) as "binder".

Examples for formulations of the mixtures of the invention containing 40 to 50% peroxide are given hereafter:

(a) Liquid formulation 42.8% of 1.1'-bis(t-butylperoxy)-3,3,5-trimethylcyclohexane, 95%
4.6% 2,5-di-t-amyl hydroquinone
9.3% triallyl mellitate
43.3% dibutyl phthalate (b) powdered formulations 41.5% dicumyl peroxide, 98%
3.7% 2,5-di-t-amyl hydroquinone, 98%
11.1% triallyl trimellitate
43.7% powdered filler
42.8% alpha,alpha'-bis(t-butylperoxy)diisopropylbenzene, 95%
5.5% 2,5-di-t-amyl hydroquinone, 98%
16.5% triallyl trimellitate
35.2% powdered filler
50.2% 2,5-dimethyl-2,5-bis(t-butylperoxy) hexane, 90%
4.2% 2,5-di-t-butyl hydroquinone
12.4% triallyl cyanurate
33.2% powdered filler (c) pasty formulation 42.8% 1,1-bis(t-butylperoxy)-3,3,5-trimethylcyclohexane, 95%
4.6% 2,5-di-t-amyl hydroquinone
9.3% triallyl trimellitate
23.3% silica
20% paraffin oil, boiling range 300° to 500° C.

(d) granular formulation 42.8% 1,1-bis(t-butylperoxy)-3,3,5,trimethylcyclohexane, 95%
4.6% 2,5-di-t-amyl hydroquinone
9.3% triallyl trimellitate
33% silica
10.3% paraffin oil, boiling range 300° to 500° C.

(e) master batch 50.2% 2,5-dimethyl-2,5-bis(t-butylperoxy) hexane, 90%
4.2% 2,5-di-t-butyl hydroquinone
16.5% triallyl trimellitate
19.1% filler
10% EPDM The formulations of the mixtures according to the invention contain, in addition to the active ingredients, 0 to 80%, based on the total weight of the mixture, of inert solid or liquid additives. "Inert" in this context is not to be understood in the strict sense of having no influence on the active ingredients during storage and crosslinkage since, for example, acidic fillers decompose a certain portion of certain peroxides (such as dicumyl peroxide) in the course of crosslinkage and so detract from its crosslinking activity. Examples for liquid inert additives are straight-chain aliphatic, branched aliphatic, alkyl-aromatic oils, oils constituting a mixture of two, three or four of the above mentioned types, phthalic acid esters or other high-boiling esters. Examples for inert inorganic (usually powdered) additives are calcium carbonate, kaolin, talcum, calcium silicate, aluminum silicate, fumed silica or precipitated silica. Examples for inert solid or liquid polymeric additives are ethylene/propylene copolymer (EPR), ethylene/propylene/diene copolymer (EPDM), natural rubber, butadiene/styrene copolymer (SBR), ethylene/vinyl acetate copolymer (EVA), polyethylene (PE), polypropylene (PP), polystyrene, polyvinyl chloride (PVC), chlorinated polyethylene, silicone rubber, silicone oil, polyethylene oil and polybutadiene oil. Each one of these additives can be used per se or in any desired combination with the other additives.

In the process of the invention the polymer is crosslinked with the combination used according to the invention in the same temperature range as with the peroxides alone. The only difference in temperature resides in the higher starting temperature of the crosslinkage owing to the combination used according to the invention, which is directly related to the scorch time extension.

The process of the invention may be carried out also with the addition of antiozonants, conventional antioxidants, glass, fibers, pigments, carbon black, UV stabilizers, foaming agents (e.g. 2,2'-azobisisobutyramide, 2,2'-azobis(ethyl isobutyrate), azodicarbonamide), flame protection agents, antistatic agents, lubricants, plasticizers or other additives.

The energy requried for crosslinkage can be supplied
(a) by direct contact of the polymer to be crosslinked with a preheated material, e.g. steel, molten metal, molten salt, water (steam), air, nitrogen;
(b) by electromagnetic radiation, e.g. IR, UHF (=microwaves), X-rays, gamma rays, or
(c) by particle radiation, e.g. alpha rays or beta rays (=electron radiation).

The invention will be explained by the following examples.

EXAMPLES

Agents and inert additives were incorporated into the polymer on a roll.

The following abbreviations are used:

Formulations of the mixtures according to the invention:

A-1

42.8% by wt of 1,1-bis(t-butylperoxy)-3,3,5-trimethylcyclohexane, 95%
4.6% by wt of 2,5-di-t-amyl hydroquinone, 98%
9.3% by wt of triallyl trimellitate
43.3% by wt of silica

B-1

41.5% by wt of dicumyl peroxide, 98%
3.7% by wt of 2,5-di-t-amyl hydroquinone, 98%
11.1% by wt of triallyl trimellitate
43.7% by wt of filler (silica/CaCO$_3$)

C-1

50.2% by wt of 2,5-dimethyl-2,5-bis(t-butylperoxy) hexane, 90%
4.2% by wt of 2,5-di-t-amyl hydroquinone, 98%
12.4% by wt of triallyl trimellitate
33.2% by wt of filler (silica/CaCO$_3$)

D-1

42.8% by wt of alpha,alpha'-bis(t-butylperoxy)diisopropylbenzene, 95%
5.5% by wt of 2,5-di-t-amyl hydroquinone, 98%
16.5% by wt of triallyl trimellitate
35.2% by wt of filler (silica/CaCO$_3$).

Standard Peroxide Formulations

A-0: 1,1-bis(t-butylperoxy)-3,3,5-trimethylcyclohexane, 40%, on inert filler
B-0: dicumyl peroxide, 40%, on inert filler
C-0: 2,5-dimethyl-2,5-bis(t-butylperoxy) hexane, 45%, on inert filler
D-0: alpha,alpha'-bis(t-butylperoxy)-diisopropylbenzene, 40%, on inert filler.

Crosslinkage of the polymers was carried out in the Monsanto-Rheometer in a heated mold with a disk oscillating about 1°. The process of crosslinkage was registered in the form of a curve and can be seen from the rise of the torque. The curve indicates the scorch time, the cross-linking time, and the crosslinkage (=resultant from degree and density of crosslinkage):

$M_L$=lowest point of the crosslinkage curve
$M_H$=highest point of the crosslinkage curve
$t_5$=scorch time (=time in minutes until 5% of the maximum crosslinkage of non-inhibited peroxide system is reached)
$t_s$=scorch time of the inhibited systems measured at equal rise of the torque (viscosity) of the corresponding non-inhibited peroxide $t_5$
$t_{90}$=crosslinkage time (=time in minutes until 90% of maximum crosslinkage are reached)
$M_H-M_L$=degree of relative crosslinkage.

The Shore hardness is a further indication of rubber crosslinkage.

COMPARATIVE EXAMPLE A

It will be demonstrated that antioxidants (without simultaneous presence of crosslinkage promoters) deteriorate the cross-linkage ($M_H-M_L$) and the Shore hardness; the tests proved that the classical antioxidants BHT and Irganox 1076 cause more deterioration than the hydroquinone derivatives.

Ethylene/Propylene/Diene Copolymer (=EPDM) of the following mixed composition
32.5% by wt EPDM of a Mooney viscosity ML (1+4) at 125° C.
1.5% by wt ZnO
29% by wt FEF carbon black
13% by wt CaCO$_3$
24% by wt paraffinic oil
was crosslinked by means of 3% of 40% dicumyl peroxide at 180° C. in the presence of 0.3% of the antioxidants 2,6-di-t-butyl-4-methylphenol (=BHT), 3-(3,5-di-t-butyl-4-hydroxyphenyl)-propionic acid stearyl ester (=Irganox 1076), 2-t-butyl hydroquinone, 2,5-di-t-butyl hydroquinone, 2-t-amyl hydroquinone, and 2,5-di-t-amyl hydroquinone in the Monsanto Rheometer (the percentages 3% and 0.3% relate to the final EPDM mixture):

| Antioxydant | $t_s/t_5$ Min. | $t_{90}$ Min. | $M_H-M_L$ | Shore-A Hardness |
|---|---|---|---|---|
| none | 0.9 | 5.1 | 52 | 50 |
| 0.3% BHT | 1.3 | 5.6 | 35 | 42 |
| 0.3% Irganox 1076 | 1.1 | 5.5 | 36 | 42 |
| 0.3% 2-t-butyl-hydroquinone | 1.3 | 5.1 | 50 | 49 |
| 0.3% 2,5-di-t-butyl-hydroquinone | 1.2 | 5.2 | 38 | 43 |
| 0.3% 2,5-di-t-amyl-hydroquinone | 1.3 | 5.1 | 51 | 49 |
| 0.3% 2-t-amyl-hydroquinone | 1.1 | 5.1 | 45 | 48 |

EXAMPLE 1

This example demonstrates that it is not possible, by combination of the antioxidants with crosslinkage promoters, to eliminate the negative effects (prolonged crosslinkage time ($=t_{90}$), inferior crosslinkage ($=M_H-M_L$)) of normal antioxidants (2,6-di-t-butyl-4-methyl phenol (=BHT), 3-(3,5-di-t-butyl-4-hydroxyphenyl)-stearyl propionate (=Irganox 1076)), whereas it is possible to eliminate those of the antioxidants of the invention (scorch time extender); the data of Comparative Example A permit further comparison.

The EPDM mixture of Comparative Example A was crosslinked by means of 3% dicumyl peroxide 40% at 180° C. in the presence of 0.3% triallyl trimellitate as crosslinkage promoter and of the antioxidants listed in the table in the Monsanto Rheometer (the percentages 3 and 0.3% and 0.3% antioxidant below relate to final EPDM mixture):

| Antioxydant | $t_s/t_5$ Min. | $t_{90}$ Min. | $M_H-M_L$ | Shore-A Hardness |
|---|---|---|---|---|
| none | 0.9 | 5.1 | 52 | 50 |
| 0.3% BHT | 1.3 | 5.8 | 42 | 45 |
| 0.3% Irganox 1076 | 1.1 | 5.9 | 42 | 45 |
| 0.3% 2-t-butyl-hydroquinone | 1.3 | 5.1 | 54 | 51 |

EXAMPLE 2

This example shows the scorch-inhibiting effect of 3% of the triple combinations of the invention as formulations A-1, B-1, C-1, and D-1 containing peroxide, scorch time extender, and crosslinkage promoter, compared with the corresponding standard peroxide formulations A-0, B-0, C-0, D-0 containing no scorch time extender and no cross-linkage promoter, in the crosslinkage of the below indicated EPDM mixture (=ethylene/propylene/diene copolymer):

| 32.5% by wt EPDM with Mooney Viscosity ML (1 + 4) at 125° C. | (100 parts) |
|---|---|
| 1.5% by wt ZnO | ( 5 parts) |
| 29% by wt FEF carbon black | ( 90 parts) |
| 13% by wt $CaCO_3$ | ( 40 parts) |
| 24% paraffinic oil | ( 75 parts) |
| | 310 parts |

| Crosslinkage Formulation | $t_s/t_5$ Min. | $t_{90}$ Min | $M_H-M_L$ | Crosslinkage Temperature | Shore-A Hardness |
|---|---|---|---|---|---|
| A-0 | 3.0% | 0.34 | 1.13 | 5 | 180° C. | 63 |
| A-1 | 3.0% | 0.68 | 1.17 | 5.9 | 180° C. | 63 |
| B-0 | 3.0% | 0.65 | 4.0 | 8.75 | 180° C. | 67 |
| B-1 | 3.0% | 1.15 | 4.3 | 9.3 | 180° C. | 67 |
| C-0 | 2.5% | 0.70 | 6.5 | 11.4 | 180° C. | 73 |
| C-1 | 2.5% | 1.55 | 5.5 | 11.4 | 180° C. | 73 |
| D-0 | 2.0% | 0.70 | 6.5 | 9.05 | 180° C. | 70 |
| D-1 | 2.0% | 1.60 | 6.6 | 9.25 | 180° C. | 70 |

The scorch times ($=t_s$) of the formulations (A-1, B-1, C-1, D-1) according to the invention are about twice as long as those $t_5$ provided by the standard peroxide formulations (A-0, B-0, C-0, D-0) containing the same amount of peroxide at virtually equal crosslinkage time ($=t_{90}$) and with equal or better crosslinkage ($=M_H-M_L$).

EXAMPLE 3

This example shows the scorch-inhibiting effect of 2% and 3% of the triple combination according to the invention as formulation B-1, C-1, and D-1 containing peroxide, scorch time extender, and crosslinkage promoter, in comparison with the corresponding standard peroxide formulations B-0, C-0, and D-0 containing no scorch time extender and no crosslinkage promoter, in the crosslinkage of HDPE (=high density polyethylene) in the Monsanto Rheometer at 150° C. and 180° C.:

| Crosslinkage Formulation | $t_s/t_5$ Min. | $t_{90}$ Min | $M_H-M_L$ | Crosslinkage Temperature |
|---|---|---|---|---|
| B-0 | 3% | 1.0 | 4.0 | 94 | 180° C. |
| B-1 | 3% | 1.4 | 4.0 | 112 | 180° C. |
| B-0 | 3% | 4.0 | 56.0 | — | 150° C. |
| B-1 | 3% | 6.0 | 55.0 | — | 150° C. |
| C-0 | 2% | 1.35 | 6.0 | 106.5 | 180° C. |
| C-1 | 2% | 1.9 | 6.0 | 110.0 | 180° C. |
| C-0 | 2% | 4.5 | 45.0 | 40.5 | 150° C. |
| C-1 | 2% | 9.0 | 48.0 | 42.5 | 150° C. |
| D-0 | 2% | 1.3 | 6.0 | 106.0 | 180° C. |
| D-1 | 2% | 1.8 | 6.3 | 103.0 | 180° C. |
| D-0 | 2% | 5.5 | 70.0 | 50.0 | 150° C. |
| D-1 | 2% | 10.5 | 76.0 | 46.0 | 150° C. |

The scorch times ($=t_s$) of the formulations of the invention (B-1, C-1, D-1) are about 1.5 to 2 times longer than the $t_5$ of the standard peroxide formulations (A-0, B-0, C-0, D-0) in substantially equal crosslinking time ($=t_{90}$) and at substantially equal degree of crosslinkage ($=M_H-M_L$).

EXAMPLE 4

This example demonstrates the scorch-inhibiting effect of 2% and 3.5% and 4% and 4.5% of the triple combination according to the invention as formulation A-1, B-1, C-1, D-1 containing peroxide, scorch time extender, and crosslinkage promoter, compared with the corresponding standard peroxide formulations A-0, B-0, C-0, and D-0 containing no scorch time extender and no crosslinkage promoter, in the crosslinkage of EVA (=ethylene/vinyl acetate copolymer) in the Monsanto-Rheometer at 150° C. and 180° C.:

| Crosslinkage Formulation | $t_s/t_5$ Min. | $t_{90}$ Min | $M_H-M_L$ | Crosslinkage Temperature |
|---|---|---|---|---|
| A-0 | 4.5% | 1.5 | 8.6 | 28.0 | 150° C. |
| A-1 | 4.5% | 3.0 | 7.2 | 39.5 | 150° C. |
| A-0 | 4.5% | 0.65 | 1.7 | 20.5 | 180° C. |
| A-1 | 4.5% | 1.1 | 1.72 | 21.0 | 180° C. |
| B-0 | 2% | 8.0 | 70.0 | 21.0 | 150° C. |
| B-1 | 2% | 15.0 | 73.0 | 30.0 | 150° C. |
| B-0 | 3.5% | 1.25 | 5.8 | 55.0 | 180° C. |
| B-1 | 3.5% | 2.0 | 5.5 | 55.0 | 180° C. |
| C-0 | 4% | 8.0 | 129.0 | 84.0 | 150° C. |
| C-1 | 4% | 18.5 | 132.0 | 93.0 | 150° C. |
| C-0 | 4% | 1.6 | 9.6 | 86.0 | 180° C. |
| C-1 | 4% | 2.5 | 9.3 | 93.0 | 180° C. |
| D-0 | 2% | 12.0 | 132.0 | 41.0 | 150° C. |
| D-1 | 2% | 33.0 | 132.0 | 41.0 | 150° C. |
| D-0 | 3.5% | 1.7 | 9.2 | 80.0 | 180° C. |
| D-1 | 3.5% | 2.8 | 8.6 | 79.0 | 180° C. |

The scorch times ($=t_s$) of the formulations of the invention (A-1, B-1, C-1, D-1) are about 1.5 to 2 times longer than the $t_5$ of the standard peroxide formulations containing the same amount of peroxide (A-0, B-0, C-0, D-0), while the crosslinking time ($=t_{90}$) is substantially equal and the degree of crosslinkage ($=M_H-M_L$) is substantially equal.

EXAMPLE 5

This example shows the good storage stability of the triple combinations A-1, B-1, C-1 and D-1 according to the invention containing peroxide, scorch time extender, and crosslinkage promoter, in comparison with the corresponding standard peroxide formulations A-0, B-0, C-0, and D-0 containing peroxide, but no scorch time extender and no crosslinkage promoter, and the formulations A-2, B-2, C-2 and D-2 containing peroxide and crosslinkage promoter, but no inhibitor, and the formulations A-3, B-3, C-3, and D-3 containing peroxide and antioxidant, but no cross-linkage promoter. The said formulations are stored in a water bath of 60° C. in a closed vessel for 10 days. The peroxide content is determined before and afterwards by means of the customary standard analysis methods. This primarily demonstrates that the stability of the peroxide is not impaired by antioxidant and crosslinkage promoter.

| Peroxide Formulation | Storage Stability (10 days at 60° C.): | | | |
|---|---|---|---|---|
| | Initial Content | Content after 10 Days | Decrease in Peroxide (a) Difference | (b) in % of Initial Content |
| A-0 | 38.7% | 30.8% | 9.6% | 23.8% |
| A-1 | 44.3% | 38.8% | 5.5% | 12.4% |
| A-2 | 42.1% | 25.6% | 16.5% | 39.2% |
| A-3 | 41.8% | 36.0% | 5.8% | 13.9% |
| B-0 | 39.8% | 39.8% | — | no decrease |
| B-1 | 38.4% | 39.1% | — | no decrease |
| B-2 | 40.1% | 35.8% | 4.3% | 10.7% |
| B-3 | 40.1% | 38.0% | 1.9% | 4.7% |
| C-0 | 46.0% | 45.0% | 1% | 2.17% |
| C-1 | 45.2% | 45.3% | — | no decrease |
| C-2 | 45.2% | 40.0% | 5.2% | 11.50% |
| C-3 | 46.0% | 44.0% | 2.0% | 4.3% |
| D-0 | 40.7% | 41.0% | — | no decrease |
| D-1 | 39.1% | 39.2% | — | no decrease |
| D-2 | 40.2% | 35.0% | 5.2% | 12.4% |
| D-3 | 40.3% | 39.5% | 0.8% | 2.0% |

The excellent stability of the mixed crosslinking agents was surprising since normally mixtures consisting of polyfunctional monomers and peroxides at this concentration are very unstable. Also peroxides mixed with hydroquinone derivatives are less stable, as is evident from these stability tests. The listed products (A-D)-2 and (A-D)-3 have the following composition:

| | |
|---|---|
| A-2 = | 43% by wt of 1,1-bis(t-butylperoxy)-3,3,5-trimethyl cyclohexane, 95% |
| | 10% by wt of triallyl trimellitate |
| | 47% by wt of silica |
| A-3 = | 43% by wt of 1,1-bis(t-butylperoxy)-3,3,5-trimethyl cyclohexane, 95% |
| | 5% by wt of 2,5-di-t-amyl hydroquinone, 98% |
| | 52% by wt of silica |
| B-2 = | 41.5% by wt of dicumyl peroxide, 98% |
| | 11.1% by wt of triallyl trimellitate |
| | 43.4% by wt of filler (silica/CaCO$_3$) |
| B-3 = | 41.5% by wt of dicumyl peroxide, 98% |
| | 4% by wt of 2,5-di-t-amyl hydroquinone, 98% |
| | 54.5% by wt of filler (silica/CaCO$_3$) |
| C-2 = | 50.2% by wt of 2,5-dimethyl-2,5-bis(t-butylpeproxy)-hexane, 90% |
| | 12.4% by wt of triallyl trimellitate, 98% |
| | 37.4% by wt of silica (filler) |
| C-3 = | 50.2% by wt of 2,5-dimethyl-2,5-bis(t-butylperoxy)-hexane, 90% |
| | 4.2% by wt of 2,5-di-t-amyl hydroquinone, 98% |
| | 55.6% by wt of filler (silica) |
| D-2 = | 42.8% by wt of α,α'-bis(t-butylperoxy)-diisopropyl-benzene, 95% |
| | 16.5% by wt of triallyl trimellitate, 98% |
| | 30.7% by wt of filler (silica/CaCO$_3$) |
| D-3 = | 42.8% by wt of α,α'-bis(t-butylperoxy)-diisopropyl-benzene, 95% |
| | 5.5% by wt of 2,5-di-t-amyl hydroquinone, 98% |
| | 51.7% by wt of filler (silica/CaCO$_3$) |

EXAMPLE 6

Example 6 shows that in the triple combinations A-1, B-1, C-1 and D-1 according to the invention not only the peroxide but also the crosslinkage promoter and the antioxidant are unaffected by storage, since the activity according to the invention of the triple combination with respect to scorch time, crosslinkage and crosslinking rate was equal to that at the start of the storage period.

The mixtures A-1, B-1, C-1 and D-1 of the invention were stored for 6 months at room temperature. They were tested for their activity in crosslinking EPDM, HDPE, and EVA after 2 months and after 6 months, as described in Examples 2, 3 and 4. The measured values were the same as those of the freshly prepared mixtures.

EXAMPLE 7

This example shows that the results obtained in the cross-linkage examples 2, 3 and 4 are obtained also when the peroxide, antioxidant, corsslinkage promoter, and filler components are added individually and in succession, rather than in the form of the batches A-1, B-1, C-1, and D-1 of the invention, to the polymers to be cross-linked prior to crosslinkage. According to this "piece-meal procedure" only a part of Examples 2, 3 and 4 was repeated, namely Example 2:
A-1 (mixture) compared with A-1 (individual)
Example 3:
B-1 (mixture) compared with B-1 (individual)
Example 4:
C-1 (mixture) compared with C-1 (individual)
D-1 (mixture) compared with D-1 (individual)

The results obtained with (A-D)-1 (mixture) were identical to those obtained with (A-D)-1 (individual).

We claim:
1. A mixture suitable for crosslinking polymers providing reduced scorch during compounding consisting essentially of:
   (a) at least one organic peroxide suitable for crosslinking polymers, said peroxide being at least 40% by weight of said mixture, and being selected from the group consisting of dialkyl peroxides, ketal peroxides, peresters, dialkyl peroxide perketals, diaryl peroxides, monoperoxy carbonates and mixtures thereof;
   (b) at least one hydroquinone derivative selected from the group represented by the general formulas I, II and III

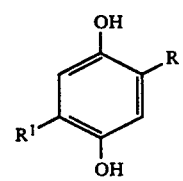

(I)

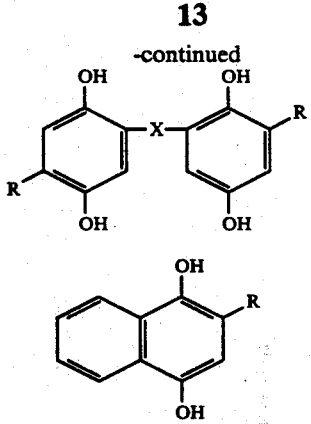

wherein R and $R^1$, which may be the same or different, represent H, t-alkyl, t-cycloalkyl, or aryl-t-alkyl and X represents $C_{1-18}$-alkylene which may be substituted by substituents selected from among the groups consisting $C_{1-10}$-alkyl, $C_{1-10}$-alkoxy, phenyl and mixtures thereof, $C_{2-18}$-alkenylene, or $C_{2-18}$-alkpolyenylene both of which may be substituted with substituents selected from among the group consisting of $C_{1-10}$-alkyl, $-(CR^2R^3)_n-AR-(CR^2R^3)_m-$ and mixtures thereof wherein $R_2$ and $R_3$ may be the same or different and represent hydrogen or $C_{1-10}$-alkyl, Ar represents phenyl or naphthyl, n and m may each vary from 0 to 18, and $n+m \leq 18$, and the hydroquinones of the formula III may be substituted by $C_{1-10}$-alkyl on the benzene ring of the naphthalene structure not substituted by the hydroxy groups and R; and (c) at least one crosslinkage promoter.

2. A mixture according to claim 1, wherein the organic peroxide is dialkyl peroxide, diaralkyl peroxide, or ketal peroxide.

3. A mixture according to claim 1, wherein the hydroquinone derivative is mono-t-butyl hydroquinone, 2,5-di-t-butyl hydroquinone, or 2,5-di-t-amyl hydroquinone.

4. A mixture according to claim 2, wherein the hydroquinone derivative is mono-t-butyl hydroquinone, 2,5-di-t-butyl hydroquinone, or 2,5-di-t-amyl hydroquinone.

5. A mixture according to claim 1, wherein the crosslinkage promoter is triallyl cyanurate, triallyl isocyanurate, or triallyl trimellitate.

6. A mixture according to claim 2, wherein the crosslinkage promoter is triallyl cyanurate, triallyl isocyanurate, or triallyl trimellitate.

7. A mixture according to claim 3, wherein the crosslinkage promoter is triallyl cyanurate, triallyl isocyanurate, or triallyl trimellitate.

8. A mixture according to claim 4, wherein the crosslinkage promoter is triallyl cyanurate, triallyl isocyanurate, or triallyl trimellitate.

9. A mixture suitable for crosslinking polymers as defined in claim 1 additionally consisting essentially of fillers selected from the group consisting of inert liquids, inert solids, polymeric binders or mixtures thereof.

* * * * *